United States Patent [19]

Bradbury et al.

[11] Patent Number: 5,306,399

[45] Date of Patent: Apr. 26, 1994

[54] ELECTROCHEMICAL EXCHANGE ANIONS IN DECONTAMINATION SOLUTIONS

[75] Inventors: David Bradbury, Tresham, United Kingdom; Christopher J. Wood, Mountain View, Calif.

[73] Assignee: Electric Power Research Institute, Palo Alto, Calif.

[21] Appl. No.: 965,892

[22] Filed: Oct. 23, 1992

[51] Int. Cl.$^5$ ............................ C25C 1/22; C02F 1/46
[52] U.S. Cl. .................................... 204/1.5; 204/182.4; 204/151; 210/670; 210/682; 210/683; 210/685; 252/626; 423/6; 423/7
[58] Field of Search ...................... 204/1.5, 182.4, 151; 210/670, 682, 683, 685; 252/626; 423/6, 7

[56] References Cited

U.S. PATENT DOCUMENTS

| | | | |
|---|---|---|---|
| 2,752,309 | 6/1956 | Emmons et al. | 210/24 |
| 3,029,200 | 4/1962 | Silker | 210/24 |
| 3,198,723 | 8/1965 | Chagnon et al. | 204/299 |
| 3,533,929 | 10/1970 | Evans et al. | 204/149 |
| 3,650,925 | 3/1972 | Carlson | 204/153 |
| 3,708,508 | 1/1973 | Schulz | 252/364 |
| 3,890,244 | 6/1975 | Carlin | 252/301.1 R |
| 3,922,231 | 11/1975 | Carlin et al. | 252/301.1 W |
| 4,118,317 | 10/1978 | Neeb et al. | 210/32 |
| 4,138,329 | 2/1979 | Kita | 210/26 |
| 4,161,447 | 7/1979 | Kojima | 210/23 H |
| 4,234,393 | 11/1980 | Hepworth et al. | 204/1.5 |
| 4,298,477 | 11/1981 | Cole | 210/674 |
| 4,330,386 | 5/1982 | Korinek et al. | 204/223 |
| 4,445,987 | 5/1984 | Benedetto | 204/98 |
| 4,508,641 | 4/1985 | Hanulik | 252/626 |
| 4,512,921 | 4/1985 | Anstine et al. | 252/626 |
| 4,537,666 | 8/1985 | Murray et al. | 204/129.95 |
| 4,549,985 | 10/1985 | Elliott | 252/631 |
| 4,615,776 | 10/1986 | Sasaki et al. | 204/98 |
| 4,645,625 | 2/1987 | Lundstrom et al. | 252/631 |
| 4,663,085 | 5/1987 | Enda et al. | 252/626 |
| 4,685,971 | 8/1987 | Murray et al. | 134/2 |
| 4,701,246 | 10/1987 | Fujita et al. | 204/130 |
| 4,705,573 | 11/1987 | Wood et al. | 134/3 |
| 4,731,124 | 3/1988 | Bradbury et al. | 134/3 |
| 4,770,783 | 9/1988 | Gustavsson et al. | 210/638 |
| 4,792,385 | 12/1988 | Snyder et al. | 204/140 |
| 4,849,074 | 7/1989 | Stritzke | 204/130 |
| 4,879,006 | 11/1989 | Turner | 204/1.5 |
| 4,880,595 | 11/1989 | Matsuda et al. | 376/313 |
| 4,882,018 | 11/1989 | Tison | 204/105 |
| 4,891,116 | 1/1990 | Stritzke | 204/241 |
| 4,895,678 | 1/1990 | Ohtsuka et al. | 252/632 |
| 5,078,842 | 1/1992 | Wood et al. | 204/1.5 |

OTHER PUBLICATIONS

H. Swope and E. Anderson, "Cation Exchange Removal of Radioactivity from Wastes," Industrial & Engineering Chem. vol. 47 (Jan. 1955).

Radioactive Waste Management and Disposal, Proceedings of Second European Community Conference, Luxembourg, Apr. 22–26, 1985, Cambridge University Press (1985).

A. D. Turner, et al., "Electrical Processes for Liquid Waste Treatment," DOE/RW/87.126 Materials Development Division, Harwell Laboratory (Aug. 1987).

Electrochemistry and Radioactive Wastes, Atom 327 pp. 14–17 (Jan. 1984).

A. D. Turner, et al., "Electrical Processes for the Treatment of Liquid Wastes," Proceedings of American Nuclear Society Int'l Topical Mtg. (Sep. 14–18, 1986).

Primary Examiner—John Niebling
Assistant Examiner—Arun S. Phasge
Attorney, Agent, or Firm—Limbach & Limbach

[57] ABSTRACT

Spent nuclear reactor coolant system decontamination solutions are first processed to remove the radioactive burden and to separate metallic impurities using cation exchange resins. The cation-processed waste solution is then flowed through an anion exchange resin held between anion-permeable membranes within an electrochemical cell. The application of electric current to the electrochemical cell causes hydroxide ions to replace captured anions held on the ion exchange resin, thereby regenerating the anion exchange resin for subsequent processing. The displaced anions migrate into the anode compartment where they can be oxidized to carbon dioxide for simple disposal.

31 Claims, 5 Drawing Sheets

FIG. 1

CIRCULATION
FIG. 2A

CHEMICAL INJECTION
FIG. 2B

CATION EXCHANGE
FIG. 2C

CLEAN UP
FIG. 2D

PROCESS DIAGRAM
FIG. 3

COMBINED CATION AND ANION CELL
FIG. 4

ELECTROCHEMICAL EXCHANGE ANIONS IN DECONTAMINATION SOLUTIONS

TECHNICAL FIELD

This invention relates generally to the treatment of spent decontamination solutions to remove their radioactive components, and more specifically this invention relates to the use of a three compartment electrochemical cell, one of which contains an anion exchange resin, to collect and to manage anionic components from decontamination solutions. Management of the anionic components is accomplished either by oxidation of these components to convert them to harmless gaseous products which can be vented to atmosphere, or by recapture and storage of the components to permit reuse in subsequent decontamination process. Use of this invention will allow the volume and the chelant content of radioactive waste arising from the decontamination process to be minimized.

BACKGROUND OF THE INVENTION

Decontamination of sub-systems of LWR plants has now become relatively common in the United States, and is widely recognized as a useful contributor to the reduction of radiation exposure of workers at these plants. Sub-system decontamination involves exposing a part of the reactor circuit to chemical solutions which dissolve the radioactive deposits which have accumulated on the process equipment, including piping. The spent decontamination solutions are then treated by ion exchange to retain all of the chemical and radioactive burden of the decontamination solution on the resin, while clean water is returned to the system. LOMI is but one example of a sub-system decontamination process having these characteristics.

In prior art decontamination solution recovery systems, the ion exchange resin normally consists of cation resin which carries the majority of the radioactive burden, and anion resin which carries the anionic components of the decontamination process chemicals. Fully loaded ion exchange resins are normally managed by dewatering or solidification in cement-based matrices, for shipment off site to an appropriate burial location. Since ion exchange resins have a relatively limited retention capacity for radioactive cations and organic anions, a relatively high mass of the material sent for disposal and burial is the ion exchange resin itself and its binding matrix as opposed to the captured chemical burden. It would therefore be desirable to have a waste treatment process for decontamination solutions which will isolate the radioactive burden in a more concentrated solid matrix than is presently achieved with routine ion exchange resin. Furthermore the anionic components of decontamination process solutions are normally non-radioactive organic acids which could in principle be converted to harmless gaseous products not requiring treatment as radioactive waste. This approach to the management of the anions present in the decontamination solutions would serve to reduce the amount of ion exchange resin requiring burial.

Presently, decontamination process reagents are normally used in a "once-through" manner, that is the manufactured chemical is added to the decontamination process circuit. Subsequently, the process reagents are removed for disposal along with the radioactive species captured on the ion exchange resins. Since these decontamination reagents are used nondestructively in the decontamination process and are not substantially altered or consumed to any significant extent during decontamination, it is therefore desirable to use, recover, recycle and reuse these decontamination reagents for several decontamination cycles.

SUMMARY OF THE INVENTION

The organic anion chemical burden of spent decontamination solutions (which is obtained following pretreatment of the spent solution by cation exchange to capture the radioactive and metallic components of decontamination solutions) is captured, collected and managed by using an electrochemical cell with compartments which combines ion exchange, electrodialysis and electrochemical reactions. In this efficient waste management technique anion exchange resin is held in a central compartment surrounded by two anion-permeable membranes which are selected because they have special properties for the transport of ionic species. After (in batch processes, or during in continuous processes) the pretreated spent decontamination solution is flowed through the anion exchange resin, electric current is applied to electrodes in anode and cathode compartments of the electrochemical cell. These anode and cathode compartments are disposed on opposite sides of the electrochemical cell central compartment containing the anion exchange resin. The applied electric current causes migration of hydroxide ions in the cathode compartment which displace the organic anions captured on the resin in the central compartment. The displaced anions then migrate from the central compartment through the anion-permeable membrane which separates the central compartment from the anode compartment and then into the anode compartment. The same applied electric current can also be used to oxidize the displaced anions which have migrated into the anode compartment where they can be converted to harmless gaseous species, such as carbon dioxide, at the anode and then safely vented to the atmosphere.

According to one embodiment of the present invention, as the anion exchange resin in the central compartment of the electrochemical cell becomes partially loaded with captured organic anions during the processing of spent decontamination solutions, the anion exchange resin can be simply and completely regenerated by continued operation of the electrochemical cell after the decontamination solution processing is complete, causing accumulation of the anions in the anode compartment of the electrochemical cell. Alternatively, the organic anions held on the anion exchange resin in the central compartment can be retained on the resin and subsequently displaced by chemical or electrochemical regeneration to yield desired reagents in solution which can be recycled for use in a subsequent decontamination process.

An object of this invention is to use relatively small amounts of anion exchange resin in the central compartment of the electrochemical cell to "capture" the organic anions before oxidizing them into harmless gaseous products which can be disposed of safely and inexpensively, or storing the organic anions for use in a subsequent decontamination.

It is an object of this invention to substantially improve the overall waste management features of cooling system decontamination processes by permitting in situ regeneration of the anion exchange resin, as a reusable intermediate device rather than as a final waste which must be managed once its capacity has been obtained.

While the present invention was specifically developed for the economic improvement of the LOMI decontamination process, it is capable of more general application to other dilute chemical decontamination processes outside of LWR cooling systems, as will be readily apparent to those of ordinary skill in the art. For example, the invention is useful for the regeneration and recycling of other spent anion exchange resins, where the retained anions are capable of conversion to gaseous products by oxidation.

BRIEF DESCRIPTION OF THE FIGURES

FIGS. 2 a through 2d are process flow diagrams showing the sequential operation of a decontamination circuit, including an electrochemical cell for capture and oxidation of organic anions according to the present invention.

DETAILED DESCRIPTION OF THE INVENTION

The present invention was developed to address the waste management of the anionic components of decontamination solution. A previous invention by the present investigators is the subject of U.S. Pat. No. 5,078,842 entitled, PROCESS FOR REMOVING RADIOACTIVE BURDEN FROM SPENT NUCLEAR REACTOR DECONTAMINATION SOLUTIONS USING ELECTROCHEMICAL ION EXCHANGE ("the '842 patent.") In the '842 patent, the cationic components of decontamination solution are managed using a cation exchange resin in the central compartment of an electrochemical cell. The disclosure of the '842 patent is hereby incorporated by this reference.

According to the present invention, the decontamination solution feed to the electrochemical cell containing the anion-capturing exchange resin is first pretreated to remove the radioactive cations and metallic impurities. This "pretreatment" can take the form of conventional ion exchange techniques well known in the art. This "pretreatment" can also take the form of the cation-capturing and managing electrochemical cell of the '842 patent.

The decontamination solutions which a particularly preferred embodiment of the present invention is designed to process are used to minimize radioactive contamination of cooling system components. LWR cooling systems experience iron and chromium bearing deposits which build up on cooling system surfaces. These metallic deposits contain radioactive constituents, making the routine and safe removal of these deposits desirable for the maintenance and repair of the cooling systems. Typically these metallic deposits are treated with an oxidizing solution to remove chromium from the deposits, followed by a decontamination solution which is an aqueous solution of chelate (EDTA, HEDTA or nitriloacetic acid) and a solubilizing agent (oxalic acid, citric acid and their mixtures). See, e.g., U.S. Pat. No. 4,792,385.

Another known decontamination solution from the LOMI process is described in U.S. Pat. No. 4,705,573. In this process, the decontamination solution contains vanadous formate, picolinic acid and sodium hydroxide. This decontamination solution can be effectively managed with the present invention.

In addition to routine maintenance of the reactor subsystems such as the cooling system, it is sometimes also necessary to take process equipment out of service permanently. There are presently efforts underway to develop effective decontamination solutions which will permit the decontamination and subsequent classification of process equipment taken out of service as standard industrial waste rather than as radioactive waste. Process equipment decontamination treatment uses solvents to dissolve the radioactive contaminants adhered to the surface of the metal pieces, as well as to dissolve the surface layers of the metal pieces to insure safe handling of the treated metal pieces. One such process disclosed in U.S. Pat. No. 4,663,085 teaches the use of aqueous nitric acid containing tetravalent cerium ions for this purpose.

The present invention is capable of removing anionic components from all types of aqueous liquid decontamination waste. The specifications for application of the present invention to clean up of a solution are that the waste solution should be compatible with standard, commercial ion exchange resins such that there will be adequate ion exchange and such that the waste will not dissolve the resin itself or clog up the resin pores to prevent ion capture. Another desirable, but not essential aspect of the waste solution to be treated is that its anionic components should be capable of oxidation at the anode of the electrochemical cell to form gaseous products which can be safely and conveniently managed. The scope of the present invention is not necessarily limited to radioactive waste management, but rather the principles developed with respect to the cooling system decontamination can equally be applied to a variety of other industrial waste streams in which it is desired to remove, capture and oxidize anionic components and to continually reuse the anion exchange resin.

Figure 1:
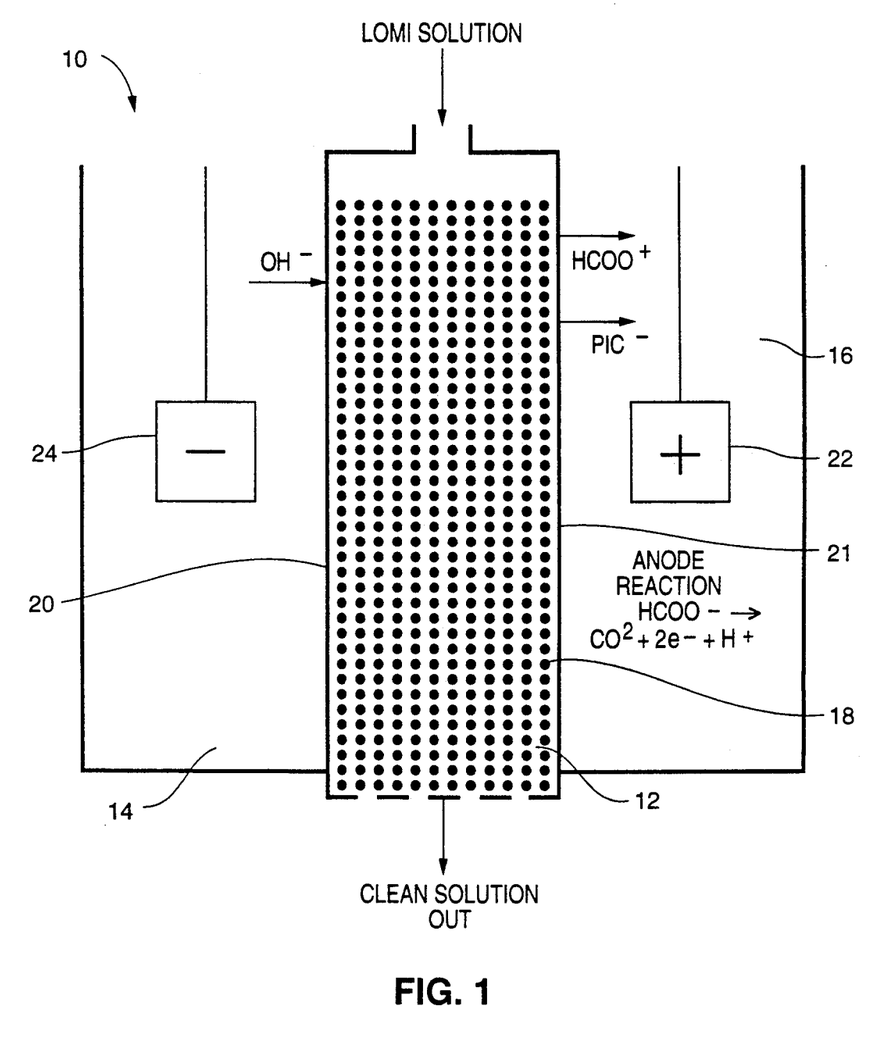
FIG. 1 is schematic representation, in cross section, of an electrochemical cell for capture and oxidation of organic anions according to the present invention.
Figure 2A:
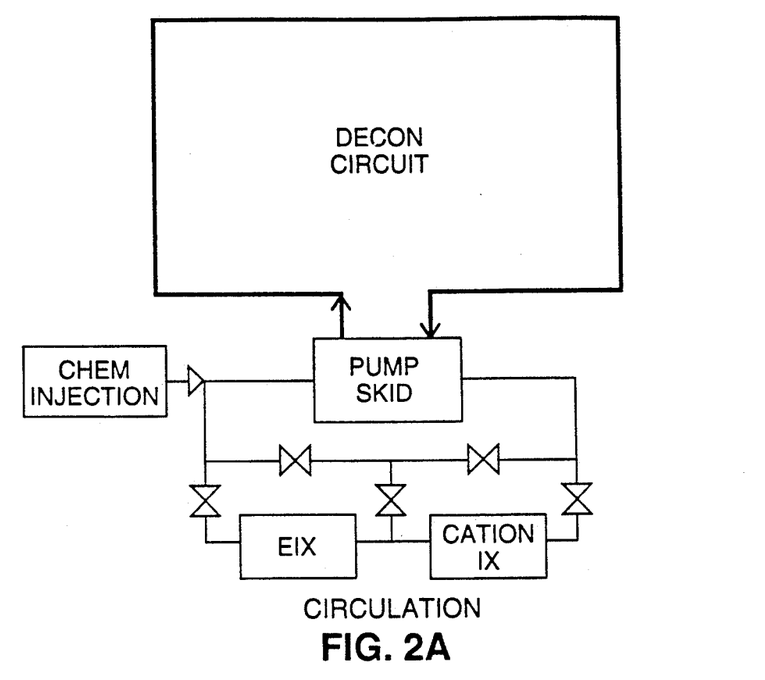
Figure 2B:
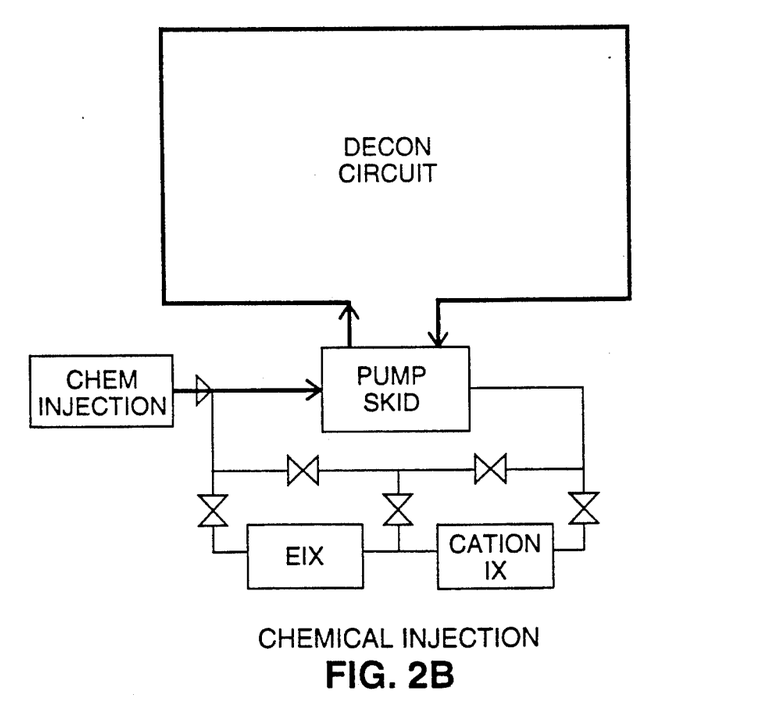
Figure 2C:
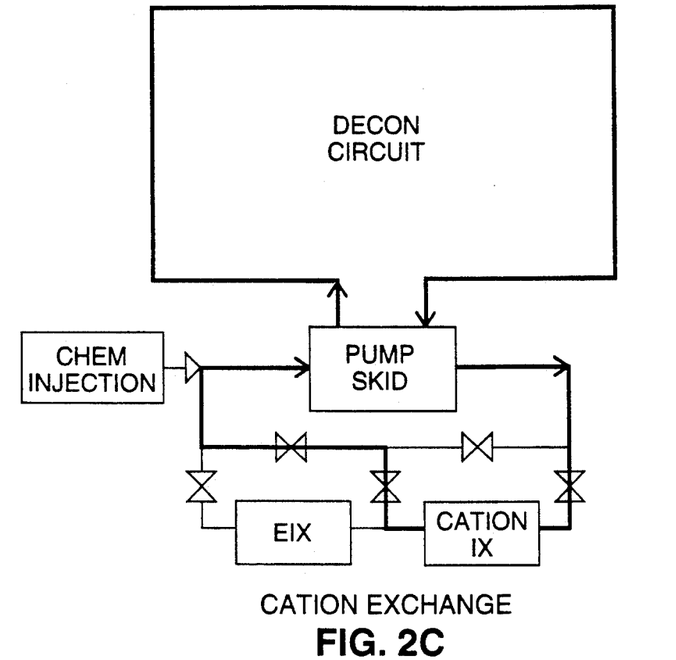
Figure 2D:
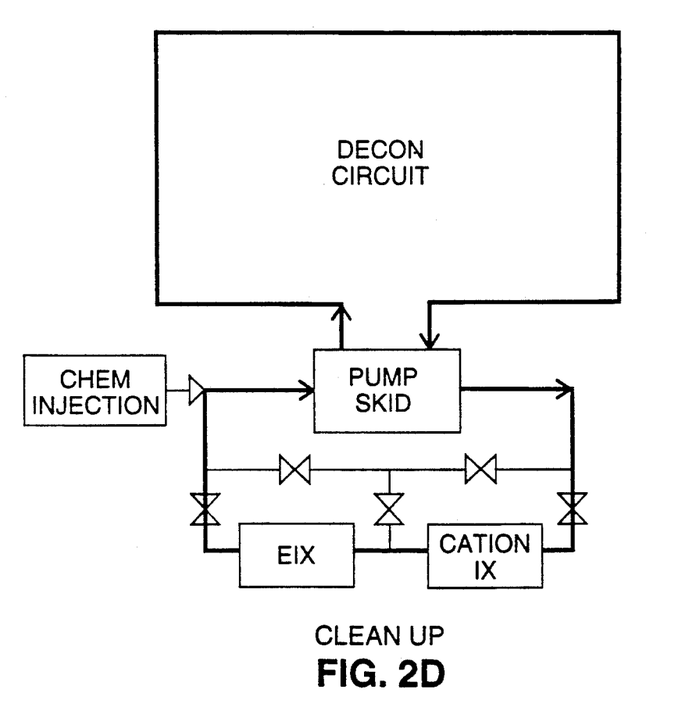

The apparatus required to practice the present invention is constructed from readily available components. An electrochemical cell 10 has a central compartment 12, a cathode compartment 14, and an anode compartment 16, as shown in FIG. 1. The central compartment 12 contains anion exchange resin 18, and is bounded by anion-permeable membranes 20 and 21. The cathode compartment 14 and the anode compartment 16 are in ion-communicating relationship with the central compartment 12 through their respective membrane interfaces. The solutions held in the anode and cathode compartments are not in direct ion contact with each other except through the electrochemical cell central compartment 12.

In a preferred embodiment, the anode electrochemical cell 22 is constructed from, or coated with a precious metal. Platinum or other commonly available industrial anodes such as platinum or ruthenium dioxide coated on titanium are particularly preferred. The anode is the site at which anions become oxidized to gaseous products. The selection of a material of construction (or coating) for the anode is a function of the anions being processed, the electrolytes and the current efficiency. These guiding factors are known in the electrochemical arts, and those of ordinary skill in the art will be able to identify and implement anodes without undue experimentation. The cathode 24 is preferably constructed from an inexpensive conductive metal such as stainless steel, although other metals may be used for specific process conditions. According to the present invention, hydroxide ions are generated at the cathode 24 and are thereafter transported through the anion-permeable membrane 20 to displace anions trapped on the anion exchange resin 18 contained within the central compartment.

Other constituents used in the present invention are chemical in nature. An electrochemical cell 10 can operate under applied current, only if the electrochemical cell contains electrolytes. The selection of appropriate electrolytes for use in practicing the invention upon a particular spent decontamination waste is dependent upon factors such as the organic anions to be captured and oxidized, the concentration of the anions in the overall waste stream, and the composition of the waste stream itself. Once these parameters are fixed for any particular process, the selection of electrolyte(s) for use in the present invention is within the skill of the ordinary artisan.

According to the present invention, at the outset of the process, the anode compartment 16 and cathode compartment 14 of the electrochemical cell both contain electrolytes. In choosing electrolytes for the cathode and anode compartments it is preferable to use chemicals which form part of the decontamination solution formulation. This has been found to be feasible, and has great advantages for safety in the event of mechanical breakage or leakage. To some extent the anode and cathode compartments tend to equilibrium, and whatever electrolyte is placed in the compartments initially a similar final composition results. Any part of the composition which is consumed by electrochemical reaction (such as formate in the anode compartment) must be maintained by additions made during operation. Thus for LOMI it is desirable to use sodium hydroxide in the cathode, sodium formate, sodium hydroxide or mixtures in the anode. For another decontamination system the electrolyte would be chosen from components in the formulation. In batch processes it is not necessary to add any electrolyte to the central compartment, as the conductivity of the compartment gradually increases during processing, presumably due to slight leakage of species through the membranes from the anode and cathode compartments.

In the event that some aspect of the process objectives cannot be satisfactorily achieved using electrolytes that form part of the decontamination formulation it is nevertheless possible to use other electrolytes for the cathode and anode compartment.

In another embodiment, the electrolyte used in the cathode compartment is sodium hydroxide. The anode compartment electrolyte is selected from sodium formate or mixtures of both.

In the two specific process protocols described more fully below, the central compartment 12 of the anion-capture electrochemical cell contains an electrolyte solution which may be the decontamination waste itself or some other material may be added to the decontamination waste, preferably formic acid or its salts. In a batch-type process, in which the application of electric current to the cell does not occur until the anion exchange resin has become fully loaded, the cell can operate with decontamination solution as the electrolyte, or the electrolyte can be added to the central compartment 12 after the flow of decontamination waste solution to the electrochemical cell has been stopped. In a continuous mode of operating the anode-capture cell, according to a preferred embodiment, the decontamination waste solution itself is the electrolyte.

The selection of a specific anion exchange resin 18 to be used in the central compartment 12 is within the skill of the ordinary artisan, without the need for undue experimentation. The anion exchange resin selection process is guided by factors which include: the composition of the decontamination waste stream to be treated, the anion-binding capacity of the resin, the cost of the resin and the ability of the resin to release its captured anions to enable substitution by hydroxide ions. In a particularly preferred embodiment, Amberlyte IRA 400 is used because it is already commonly used in other LWR decontamination waste processes. Other anion resins can be used in place of Amberlyte IRA 400, such as Sybron IONAC 365. This list of anion exchange resins is intended to be illustrative and not exhaustive or limiting.

The anion exchange resin-containing central compartment is bounded on two sides by anion-permeable membranes. These membranes allow the selective transport of anionic species from compartment to compartment which in turn enables the displacement of captured anions and the subsequent migration of the anions toward the anode where the anions are oxidized, preferably into safe and easily disposable gaseous products such as carbon dioxide. The selection of the anion permeable membranes 20 and 21 is within the skill of the ordinary artisan. Representative materials include commercially available TOSFLEX Fluorinated Anion Exchange Membrane IE-SF34 from TOSOH Corporation. When choosing an anion-permeable membrane, the selection is guided by the ion transport characteristics and durability of the membrane materials. It is possible that for particular applications of the present invention, it may be appropriate for membrane 20 and 21 to be fabricated from the same materials, and in other instances from different materials.

A potential problem which may arise in the operation of an electrochemical cell having three compartments in ion-communicating relationship involves the potential chemical back-diffusion of ions through the anion-permeable membrane, counter to the direction of the applied electrical field. While this problem was of considerable importance in the operation of the cation capturing electrochemical cell of the '842 patent, back-diffusion does not appear to present a significant problem in the anion-capture cell. Potential back diffusion problems are minimized or eliminated by the appropriate choice of anion-permeable membrane materials, and the efficient oxidation of the organic anions at the anode.

EXAMPLE 1

The principle of the invention is further demonstrated by the following example. A laboratory electrochemical cell for anion removal and oxidation was constructed as outlined above. A solution containing picolinic acid and formic acid was prepared, and passed through the central compartment of the cell at the rate of 7.5 bed volumes per hour. The central compartment contained Amberlyte IRA 400. After the experiment was complete the eluted solution, the cathode and anode solutions were analyzed, and the anion exchange resin was regenerated with sodium hydroxide to measure the amount of acids destroyed. The results are set forth in Table 1.

TABLE 1

| Anode-Capture Cell Performance Data | Picolinic Acid (mg) | Formic Acid (mg) |
|---|---|---|
| Input | 26,080 | 26,410 |
| Output | 6,913 | 6,426 |
| Retained (Input - Output) | 19,167 | 20,164 |
| Recovered in Cathode Solution | 174 | 211 |
| Recovered in Anode Solution | 1,720 | 6,628 |
| Recovered on Resin | 2,772 | 4,856 |
| Total Recovered | 4,666 | 11,695 |
| Oxidized (Retained - Recovered) | 14,501 | 8,469 |
| % Oxidized | 55 | 31 |

The conditions in the anode-capture electrochemical cell were not optimized, and in particular the elution volume from the cell column ("Output" in Table 1) was greater than in a normal ion exchange column. This is considered to be a function of the small scale of the apparatus used in this experiment. However, the results above demonstrate the principle that the organic anions can be captured and oxidized.

EXAMPLE 2

A series of runs were performed using a simulant inlet solution of picolinic and formic acids at strengths of 30 mM and 20 mM respectively.

The test procedure consisted of feeding the simulant solution through the anoda-capture electrochemical cell (160 ml Amberlyte IRA 400 resin) at a rate of 5-10 bed volumes per hour. Measurement of picolinic and formic acid concentrations were made on the inlet solutions, effluent solutions, anolyte and catholyte solutions and the solution obtained by regenerating the resin with sodium hydroxide at the end of the experiment.

Test runs were performed to investigate the capture and migration of picolinic and formic acids, to look for evidence of oxidation of organic acids in the anode compartment and to study the effects of parameters such as inlet feed rate and temperature on the efficiency of the process.

TABLE 2

| | | Picolinic and Formic Acid Mass Balance | | | | | | | |
|---|---|---|---|---|---|---|---|---|---|
| Run No | Flow Rate b.v. hr$^{-1}$ | A | B | C | D | E | Weight mg. | % of Total | % of Migrated |
| Picolinic Acid Results | | | | | | | | | |
| 1 | 4 | 1,690 | 0.0 | 263 | 103 | 2.6 | 1,320 | 78 | 92 |
| 2 | 5.5 | 3,276 | 176 | 0.0 | 669 | 1,637 | 795 | 24 | 54 |
| 3 | 7.5 | 26,080 | 6,913 | 174 | 1,720 | 2,772 | 14.501 | 55 | 89 |
| 4 | 10 | 29,343 | 11,025 | 425 | 1,119 | 2,173 | 14,600 | 49 | 93 |
| Formic Acid Results | | | | | | | | | |
| 5 | 7.5 | 26,410 | 6,426 | 211 | 6,628 | 4,856 | 8,289 | 31 | 55 |

A = Total mg in feed
B = mg in Effluent
C = mg in Catholyte
D = mg in Anolyte
E = mg regenerated from Resin The amount of picolinic acid (column "B") found in the eluent of runs 3 and 4 clearly showed some slippage of anions through the cell. However, in all cases picolinic acid was destroyed in the process to varying degrees dependent on the exact conditions.

Dismantling and inspection of the anion-capture electrochemical cell after completion of the test runs revealed a distortion of some of the inner components. This problem was one of materials of manufacture and can be easily overcome. It did, however, affect the treatment efficiency of this particular cell.

In run 1, the resin was electrochemically regenerated after the effluent feed had stopped. This explains its high 'overall' anion destruction rate. When the amount of picolinic acid destroyed is compared with the amount migrated into the anode compartment then all of the runs have a very similar performance. This is high at approximately 90%.

The low figure for run 2 is a result of an interruption in the power supply to the unit. This allowed back diffusion of the organic acids from the anode compartment to the central compartment containing the anion exchange resin.

Runs 3 and 4 showed the process to be sustainable, with a combined picolinate and formate treatment of over twice the anion exchange resin capacity. The approximately 90% rate of destruction of migrated picolinate indicates that no electrode poisoning was occurring at the anode.

During the period of a six hour run the pH in the anode was observed to fall from 13.85 to 10.3. This is most likely to have been caused by $CO_2$ bubbling at the anode being absorbed in the sodium hydroxide solution to produce sodium carbonate.

Table 3 shows the effect of temperature on cell current.

TABLE 3

| | Effect of Temperature on Power Consumption | | | |
|---|---|---|---|---|
| Run No | Temp Resin °C. | Const Current Amps | Voltage Required Volts | Power Requirement Watts |
| 1 | 26 | 9 | 8 | 72 |
| 2 | 43 | 9 | 6.5 | 58.5 |
| 3 | 58 | 9 | 6.2 | 55.8 |
| 4 | 73 | 9 | 6.2 | 55.8 |
| 5 | 83 | 9 | 6.2 | 55.8 |

It is expected that the electrical resistance would decrease with increasing cell temperature. However, it is demonstrated by these figures that no significant gain was made above 45° C. This is important when considering resin stability and process efficiency.

TABLE 4

Effect of Temperature on Oxidation Efficiency

| Run No | Temp Resin | Inlet mg | Outlet mg | Remaining in cell | % Lost | Faradays Consumed | Picolinic Acid Destroyed per Faraday (mg) |
|---|---|---|---|---|---|---|---|
| 1 | 40 | 3200 | 1562 | 419 | 38 | 0.083 | 14,686 |
| 2 | 50 | 3200 | 1452 | 510 | 38.6 | 0.135 | 9,170 |
| 3 | 60 | 3200 | 1066 | 538 | 50 | 0.132 | 12,090 |
| 4 | 70 | 3200 | 506 | 546 | 67 | 0.208 | 10,327 |

Table 4 gives results from a series of runs at various temperatures 'normalised' to a standard inlet mass for direct comparison. There is a reduction in electrical efficiency with increasing current. This is consistent with a process where an increasing proportion of the current is being carried by ions which are not doing useful work, i.e. increased mobility of small anions, e.g. $OH^-$ or increased diffusion through the anion selective membranes of cations such as sodium.

The concentration of picolinic acid was determined using U.V. spectrometry.

The concentrations of picolinic acid determined in the anode compartment at the end of each run, Table 2, clearly showed picolinic acid was being destroyed. Similarly formic acid was also seen to be destroyed, run 5, Table 2.

A number of possible reaction mechanisms, consistent with the conditions within the electrochemical cell were investigated by analyzing for the expected end products. No species containing a pyridine ring (or derivative) was detected. It was therefore concluded that the oxidation step had progressed at least as far as the destruction of the pyridine ring.

Attempts to analyze for smaller aliphatic compounds using gas chromatography were inconclusive.

To assess whether the organic oxidation was progressing through to production of gases such as carbon dioxide, nitrogen or nitrous oxides and hydrogen, samples of the anolyte solution were tested for their total organic carbon content. The results of these tests are given in Table 5.

TABLE 5

Anodic Oxidation

| Sample No | Picolinic Acid Migrated to Anode mg | Formic Acid Migrated to Anode mg | Expected T.O.C. p.p.m. | Measured T.O.C. p.p.m. | Material Destroyed % |
|---|---|---|---|---|---|
| 1 | 1324 | 883 | 1005 | <1000 | — |
| 2 | 1463 | 965 | 1107 | <1000 | — |
| 3 | 16221 | 10819 | 12317 | <1000 | ≧91.8 |
| 4 | 15720 | 10485 | 11936 | <1000 | ≧91.6 |

The T.O.C. method available for analysis of the anolyte solutions was less sensitive than desired. However, in samples 3 and 4 a clear loss of organic carbon was measured. It cannot be assumed from this result that all undetected organic carbon has undergone oxidation to gaseous species. Some soluble species may have diffused through the membrane into the outlet effluent. Confirmatory work of off-gas analysis and effluent analysis was not performed in this phase of work.

EXAMPLE 3

For the purposes of characterizing the application of the anion-capture electrochemical cell to actual plant conditions, we have simulated the decontamination of an 8,000 gallon BWR sub-system (e.g. Suction or Discharge) with LOMI with a target decontamination time of not in excess of about eight hours, with six hours clean-up time, using a cation ion exchange unit for pretreatment and an anion-capture electrochemical cell according to the present invention for removal of the anions. Total vanadium usage would be 5 kg, equivalent to 5 kg iron removed. Another assumption made is that the picolinic acid added is six times the iron concentration at its average anticipated level (75 ppm). The iron in solution may rise above this level for a period.

The anion-capture electrochemical cell for anion treatment used in this example consists of ten cells constructed as a "sandwich", each having 1 meter square area. Each cell would have a resin compartment thickness of about two centimeters. The total anion resin volume would be approximately 200 liters (7 cubic feet).

FIG. 2 illustrates sequential operation of the decontamination circuit, with bold lines representing fluid flow in that step. First, picolinic acid (about 30 kg) and about one third of the sodium hydroxide is added to the system, followed by addition of about one third of the vanadous formate. Once mixing is established and while the decontamination is taking place, the cation exchange unit for removing radioactive cations and metallic impurities would be valved in at a continuous flow of about 20 gpm. Periodically additional vanadous formate and sodium hydroxide is added to the decontamination circuit, until the total amount added is equivalent to that used in a normal decontamination process. When the decontamination process reaches completion the decontamination solutions can be processed through a first electrochemical cell to remove cations followed by a second electrochemical cell to remove anions. A small mixed bed conventional ion exchange resin column is used to remove the last traces of impurities from the water.

Following completion of the decontamination the liquids can be drained from the unit and it can be transported to another site for further decontamination duty.

Figure 3:
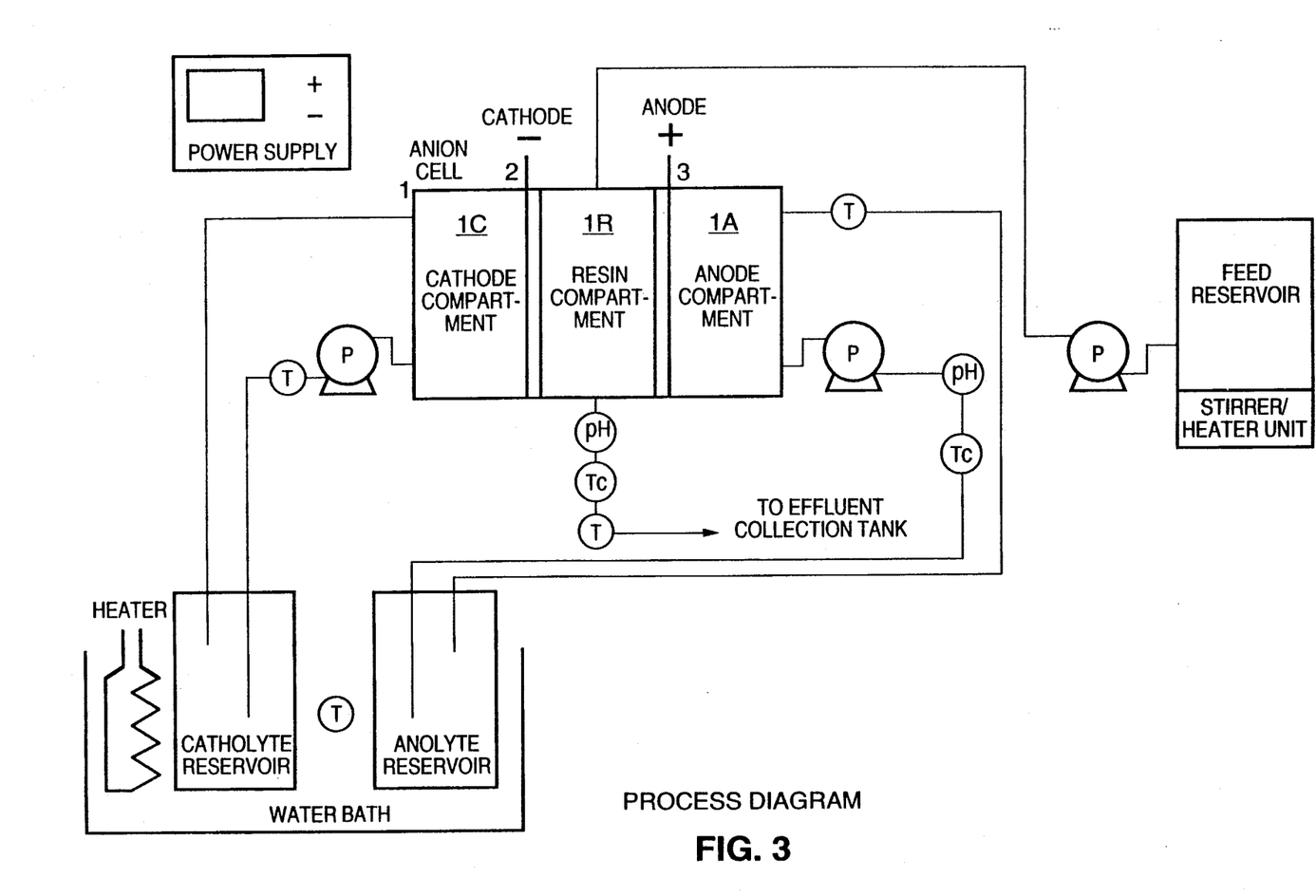
FIG. 3 is a perspective view of a laboratory scale electrochemical cell having a central compartment containing anion exchange resin in ion-communicating relationship with an adjacent anode compartment and an adjacent cathode compartment.
Figure 4:
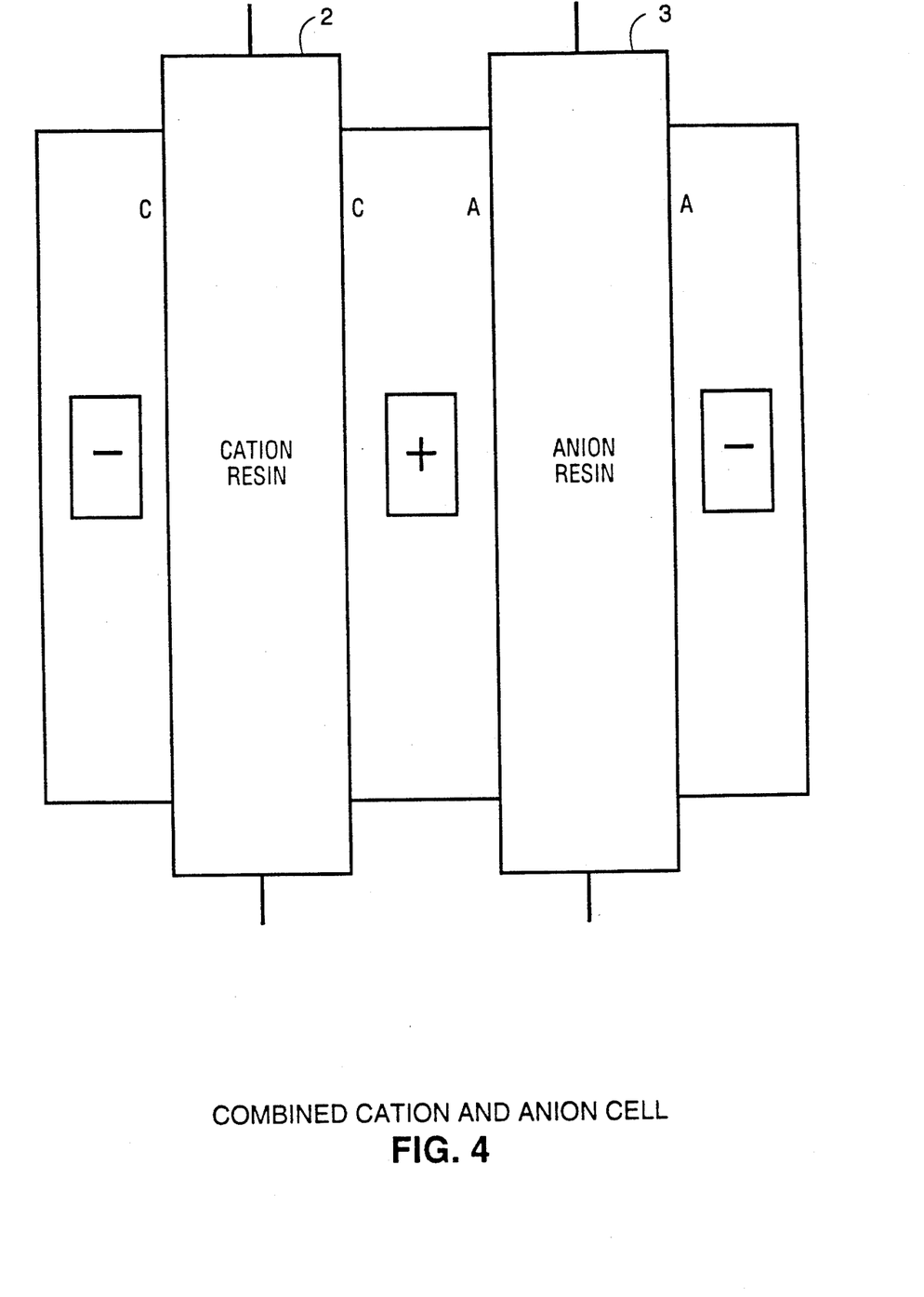
FIG. 4 is a schematic of an electrochemical cell which combines an electrochemical cell for the capture of organic anions with a pretreatment of spent decontamination process solution by a cation exchange resin which removes the radioactive cations and metallic impurities from the decontamination process solution.

The fundamental principles of operation of the instant process are described with reference to schematic diagram of FIGS. 3 and 4. The "spent" decontamination solution (in the present example, LOMI solution) is passed through cation exchange resin to remove the radioactive contaminants, metallic impurities (e.g., iron) and the vanadium added to achieve decontamination in the LOMI process from the "spent" decontamination solution. This cation-processed waste solution is then stored in reservoir 4 from which it is pumped to the central compartment IR of the anion-capture electrochemical cell containing anion exchange resin. According to a first embodiment, no electric current is applied to the cathode 2 and anode 3 of the anion-capture electrochemical cell at the time that processed decontamination solution is being flowed through the anion exchange resin. In this first embodiment, current is only applied to the anion-capture electrochemical cell subsequent to the flowing step.

In the first embodiment which can be considered "batchwise," as the anion exchange resin approaches its anion loading capacity, the electrochemical cell 1 is taken out of service, i.e., no more spent cation-processed decontamination solution is fed to the central compartment IR. In actual industrial plant practice, the cation-processed decontamination solution would be diverted to another anion-capture electrochemical cell similarly configured operating in parallel with the electrochemical cell 1. The chemistry of the isolated cell 1 can then be adjusted to maximize its conductivity by the addition of an electrolyte, e.g., formic acid or its salts, to the central compartment.

In a preferred embodiment, the decontamination solution itself serves as the electrolyte after any electrolyte has been added to the central compartment IR, electric current is applied to the electrodes in the electrochemical cell. Since the cathode compartment 1C contains an alkaline solution, the electric current applied to the cell electrodes causes hydroxide ions to migrate from the cathode compartment 1C into the central compartment 1R. The hydroxide ions replace the previously captured anions present on the anion exchange resin. The organic anions liberated from the anion exchange resin then migrate from the central compartment 1R, through the anion-permeable membrane and into the anode compartment 1A. The anode compartment chemistry can then be adjusted to cause the organic anions in the anode compartment to oxidize to carbon dioxide.

In the second embodiment, also described with reference to FIG. 4, a continuous mode of operation is used. In this embodiment, electric current is passed between anode 3 and cathode 2 while the cation-pretreated decontamination solution passes through the anion exchange resin in central compartment IR. This continuous mode of operation does not involve the separate addition of formic acid or its salts to provide an electrolyte in the central compartment IR.

While the present invention has been described with reference to a particularly preferred embodiment, it should be apparent to those of ordinary skill in the art that modifications and substitutions can be made and still remain within the spirit and scope of the appended claims.

What is claimed is:

1. A process for removing organic anions from spent decontamination process solutions comprising the steps of:
    a) providing a cation exchange resin with cation capture sites;
    b) providing an electrochemical cell with electrolytes, said cell having
        a central compartment containing anion exchange resin with anion capture sites and bounded by two anion-permeable membranes;
        a cathode compartment containing electrolyte and a cathode,
        an anode compartment containing electrolyte and an anode; and,
        said cell central compartment in ion-communicating relationship with said cathode compartment through one of said anion-permeable membranes and with said anode compartment through the second of said anion-permeable membranes;
    c) flowing spent decontamination process solution through said cation exchange resin to capture any radioactive components and metallic impurities contained in said decontamination process solution on said cation exchange resin cation capture sites and eluting an outlet feed from said cation exchange resin which contains organic anions;
    d) flowing said outlet feed containing organic anions through said electrochemical cell central compartment anion exchange resin to capture outlet feed organic anions on said anion exchange resin anion capture sites, said outlet feed flowing to said central compartment until said central compartment anion exchange resin approaches full loading of its capture sites;
    e) stopping the flow of said outlet feed into said electrochemical cell central compartment when said central compartment anion exchange resin capture sites are substantially fully loaded;
    f) applying electric current to said electrochemical cell through its anode and cathode thereby causing hydroxide ions to migrate from said cathode compartment through said anion-permeable membrane into said central compartment where hydroxide ions replace the captured organic anions present on the anion exchange resin anion capture sites, and where organic anions displaced from said anion exchange resin by said hydroxide ions thereafter migrate through said second anion-permeable membrane into said anode compartment; and,
    g) removing said migrated organic anions from said electrochemical cell anode compartment.

2. The process of claim 1 wherein said process further comprises the step of adding electrolyte to said electrochemical cell central compartment prior to said applying step (f).

3. The process of claim 2 wherein said electrochemical cell cathode compartment electrolyte is an aqueous solution of sodium hydroxide.

4. The process of claim 1 wherein said step (g) involves adjusting said anode compartment chemistry and applying electric current to said electrochemical cell to cause organic anions present in said anode compartment to become oxidized.

5. The process of claim 1 wherein said spent decontamination process solution is spent LOMI decontaminant solution.

6. The process of claim 1 wherein said electrochemical cell anode is fabricated from or coated with materials selected from the group consisting of platinum, ruthenium dioxide and their mixtures.

7. A continuous process for removing organic anions from spent decontamination process solutions comprising the steps of:
    a) providing a cation exchange resin with cation capture sites;
    b) providing an electrochemical cell, said cell having
        a central compartment containing anion exchange resin with anion capture sites and bounded by two anion-permeable membranes;
        a cathode compartment containing electrolyte and a cathode,
        an anode compartment containing electrolyte and an anode; and,
        said cell central compartment in ion-communicating relationship with said cathode compartment through one of said anion-permeable membranes and with said anode compartment through the second of said anion-permeable membranes;

c) flowing spent decontamination process solution through said cation exchange resin to capture any radioactive components and metallic impurities contained in said decontamination process solution on said cation exchange resin cation capture sites and eluting an outlet feed from said cation exchange resin which contains organic anions;

d) flowing said outlet feed containing organic anions through said electrochemical cell central compartment anion exchange resin to capture outlet feed organic anions on said anion exchange resin anion capture sites;

e) applying electric current to said electrochemical cell through its anode and cathode thereby causing hydroxide ions to migrate from said cathode compartment through said anion-permeable membrane into said central compartment where said hydroxide ions replace the captured organic anions present on the anion exchange resin anion capture sites, and where organic anions displaced from said anion exchange resin by said hydroxide ions thereafter migrate through said second anion-permeable membrane into said anode compartment; and, f) removing said migrated organic anions from said electrochemical cell anode compartment.

8. The process of claim 7 wherein said step (f) involves adjusting said anode compartment chemistry and applying electric current to said electrochemical cell to cause organic anions present in said anode compartment to become oxidized to carbon dioxide.

9. The process of claim 7 wherein said spent decontamination process solution is spent LOMI decontamination solution.

10. The process of claim 7 wherein said electrochemical cell cathode compartment contains an electrolyte which is an aqueous solution of sodium hydroxide.

11. The process of claim 7 wherein said electrochemical cell anode is fabricated from or coated with a material selected from the group consisting of platinum, ruthenium dioxide and their mixtures.

12. A process for treating spent decontamination process solutions comprising the steps of:

a) providing a cation-capture electrochemical cell, said cation-capture electrochemical cell having
a central compartment containing cation exchange resin with cation capture sites and bounded by two cation-permeable membranes;
a cathode compartment containing a cathode,
an anode compartment containing an anode; and,
said cation-capture electrochemical cell central compartment in ion-communicating relationship with said cathode compartment through one of said cation-permeable membranes and with said anode compartment through the second of said cation-permeable membranes;

b) flowing spent decontamination process solution into, through and out of said cation-capture electrochemical cell central compartment cation exchange resin to capture cationic components and metallic impurities from said decontamination process solution on said resin cation capture sites until said central compartment cation exchange resin approaches full loading of its cation capture sites and eluting an outlet feed from said cation-capture electrochemical cell compartment which contains organic anions;

c) stopping the flow of said decontamination process solution into said cation-capture electrochemical cell central compartment when said central compartment cation resin cation capture sites are substantially fully loaded;

d) applying electric current to said cation-capture electrochgmical cell through its anode and cathode thereby causing hydrogen ions to migrate from said cation-capture electrochemical cell anode compartment through said cation-capture electrochemical cell cation-permeable membrane into said cation-capture electrochemical cell central compartment where said hydrogen ions replace the captured cations present on said cation-capture electrochemical cell cation exchange resin cation-capture sites, and where cations displaced from said cation exchange resin by said hydrogen ions thereafter migrate through said cation-capture electrochemical cell second cation-permeable membrane into said cation-capture electrochemical cell cathode compartment;

e) removing said metal ions from said cation-capture electrochemical cell cathode compartment;

f) providing an anion-capture electrochemical cell, said anion-capture electrochemical cell having
a central compartment containing anion exchange resin with anion capture sites and bounded by two anion-permeable membranes;
a cathode compartment containing a cathode,
an anode compartment containing an anode; and,
said anion-capture electrochemical cell central compartment in ion-communicating relationship with said cathode compartment through one of said anion-permeable membranes and with said anode compartment through the second of said anion-permeable membranes;

g) flowing said caption-capture electrochemical cell outlet feed through said anion-capture electrochemical cell central compartment anion exchange resin to capture organic anions on said anion exchange resin anion capture sites until said central compartment anion exchange resin approaches full loading of its anion capture sites;

h) stopping the flow of said outlet feed into said anion-capture electrochemical cell central compartment when said central compartment anion exchange resin anion capture sites are substantially fully loaded;

i) applying electric current to said anion-capture electrochemical cell through its anode and cathode thereby causing hydroxide ions to migrate from said anion-capture electrochemical cell cathode compartment through said anion-permeable membrane into said anion-capture electrochemical cell central compartment where hydroxide ions replace the captured organic anions present on said anion exchange resin anion capture sites, and where organic anions displaced from said anion exchange resin by said hydroxide ions thereafter migrate through said second anion permeable membrane into said anion-capture electrochemical cell anode compartment; and, j) removing said organic anions from said anion-capture electrochemical cell anode compartment.

13. The process of claim 12 wherein said process further comprises the step of adding electrolyte to said cation-capture electrochemical cell central compartment prior to said applying step 14. The process of claim 13 wherein said caption-capture electrochemical cell electrolyte added to said cation-capture electrochemical central compartment is formic acid.

15. The process of claim 12 wherein said process further comprises the step of adding electrolyte to said anion-capture electrochemical cell central compartment prior to said applying step.

16. The process of claim 15 wherein said second anion-capture electrochemical cell electrolyte is an aqueous solution of sodium hydroxide.

17. The process of claim 12 wherein said step (e) involves adjusting said anion-capture electrochemical cell cathode compartment chemistry and applying electric current to said cation-capture electrochemical cell to cause cations in said cation-capture electrochemical cell cathode compartment to plate onto said cathode as a metallic deposit.

18. The process of claim 12 wherein said spent decontamination process solution is spent LOMI decontaminant solution.

19. The process of claim 12 wherein said cation-capture electrochemical cell electrolyte is an electrolyte selected from the group consisting of formic acid and its salts.

20. The process of claim 12 wherein said anion-capture electrochemical cell anode is coated with a material selected from the group consisting of platinum, ruthenium dioxide and their mixtures.

21. The process of claim 12 wherein said cation-capture electrochemical cell cathode is constructed from stainless steel.

22. The process of claim 12 wherein said step (j) involves adjusting said anion-capture electrochemical cell anode compartment chemistry and applying electric current to said anion-capture electrochemical cell to cause organic anions in said anode compartment to oxidize to carbon dioxide.

23. A continuous process for treating spent decontamination process solutions comprising the steps of:
    a) providing a cation-capture electrochemical cell, said cation-capture electrochemical cell having
        a central compartment containing cation exchange resin with cation-capture sites and bounded by two cation-permeable membranes;
        a cathode compartment containing a cathode,
        an anode compartment containing an anode; and,
        said cation-capture electrochemical cell central compartment in ion-communicating relationship with said cathode compartment through one of said cation-permeable membranes and with said anode compartment through the second of said cation-permeable membranes;
    b) flowing spent decontamination process solution into, through and out of said cation-capture electrochemical cell central compartment cation exchange resin to capture cationic components and metallic impurities from said decontamination process solution on said resin cation capture sites, and eluting an outlet feed from said cation-capture electrochemical cell which contains organic anions;
    c) applying electric current to said cation-capture electrochemical cell through its anode and cathode thereby causing hydrogen ions to migrate from said cation-capture electrochemical anode compartment through said cation-capture electrochemical cell cation-permeable membrane and into said cation-capture electrochemical cell central compartment where said hydrogen ions replace the captured cations present on said cation-capture electrochemical cell cation exchange resin cation capture sites, and where cations displaced from said cation exchange resin by said hydrogen ions thereafter migrate through said cation-capture electrochemical cell second cation-permeable membrane into said cation-capture electrochemical cell cathode compartment;
    f) removing said metal ions from said cation-capture electrochemical cell cathode compartment;
    g) providing an anion-capture electrochemical cell, said anion-capture electrochemical cell having
        a central compartment containing anion exchange resin with anion capture sites and bounded by two anion-permeable membranes;
        a cathode compartment containing a cathode,
        an anode compartment containing an anode; and,
        said anion-capture electrochemical cell central compartment in ion-communicating relationship with said cathode compartment through one of said anion-permeable membranes and with said anode compartment through the second of said anion-permeable membranes;
    h) flowing said cation-capture electrochemical cell outlet feed through said anion-capture electrochemical cell central compartment anion exchange resin to capture organic anions on said anion exchange resin anion capture sites;
    i) applying electric current to said anion-capture electrochemical cell through its anode and cathode thereby causing anions to migrate from said anion-capture electrochemical cell cathode compartment through said anion permeable membrane and into said anion-capture electrochemical cell central compartment where hydroxide ions replace the captured organic anions present on the anion exchange resin capture sites, and where organic anions displaced from said anion exchange resin by said hydroxide ions migrate through said second anion permeable membrane into said anion-capture electrochemical cell anode compartment; and,
    l) removing said organic anions from said anion-capture electrochemical cell anode compartment.

24. The process of claim 23 wherein said step (f) involves adjusting said cation-capture electrochemical cell cathode compartment chemistry and applying electric current to said cation-capture electrochemical cell to cause cations in said cation-capture electrochemical cathode compartment to plate onto said cathode as a metallic deposit.

25. The process of claim 23 wherein said spent decontamination process solution is spent LOMI decontaminant solution.

26. The process of claim 23 wherein a cation-capture electrochemical cell electrolyte is added and said electrolyte is selected from the group consisting of formic acid and its salts.

27. The process of claim 23 wherein a cation-capture electrochemical cell electrolyte is added to said cation-capture electrochemical cell central compartment in step (d), said electrolyte being formic acid.

28. The process of claim 23 wherein said anion-capture electrochemical cell anode is coated with a material selected from the group consisting of platinum, ruthenium dioxide and their mixtures.

29. The process of claim 23 wherein said cation-capture electrochemical cell cathode is constructed from stainless steel.

30. The process of claim 23 wherein said step (1) involves adjusting said anion-capture electrochemical cell anode compartment chemistry and applying electric current to said cation-capture electrochemical cell to cause organic anions in said cation-capture electrochemical cell anode compartment to oxidize to carbon dioxide.

31. The process of claim 23 wherein an anion-capture electrochemical cell electrolyte is added, said electrolyte being an aqueous solution of sodium hydroxide.

* * * * *